United States Patent [19]
Sendova et al.

[11] Patent Number: 6,099,145
[45] Date of Patent: Aug. 8, 2000

[54] ENHANCED MTBF BACKLIGHT SYSTEM AND RELATED METHOD

[75] Inventors: Mariana Sendova, Sarasota; Ellis G. Miller, Myakka; Bret M. Lee, Sarasota, all of Fla.

[73] Assignee: Baker Electronics, Inc., Sarasota, Fla.

[21] Appl. No.: 09/181,680

[22] Filed: Oct. 29, 1998

Related U.S. Application Data

[60] Provisional application No. 60/063,572, Oct. 30, 1997.

[51] Int. Cl.$^7$ ........................................................ F21V 8/00
[52] U.S. Cl. ........................... 362/276; 362/277; 362/31; 362/32; 362/33; 359/48; 359/599
[58] Field of Search ..................................... 362/276, 277, 362/27, 31, 32, 33, 97, 326, 327, 374, 330; 359/48, 599

[56] References Cited

U.S. PATENT DOCUMENTS

| | | |
|---|---|---|
| 5,053,929 | 10/1991 | Le Gars ........................................ 362/32 |
| 5,089,943 | 2/1992 | Wolfelschneider ........................ 362/216 |
| 5,479,275 | 12/1995 | Abileah ...................................... 359/418 |
| 5,537,296 | 7/1996 | Kimura et al. ............................. 362/31 |
| 5,555,160 | 9/1996 | Tawara et al. ............................. 362/31 |
| 5,619,402 | 4/1997 | Liu .............................................. 363/20 |
| 5,664,873 | 9/1997 | Kanda et al. .............................. 362/97 |
| 5,673,128 | 9/1997 | Ohta et al. ................................. 349/62 |

*Primary Examiner*—Cassandra Spyrou
*Assistant Examiner*—Mohammad Y. Sikder
*Attorney, Agent, or Firm*—McDermott, Will & Emery

[57] ABSTRACT

A first backlight light source is energized either at full or reduced rated power, until such time as the brightness which can be produced has reduced by a predetermined amount (e.g. half of the original level). A second or backup source is then switched on while the first is temporarily switched off. When the backup light source has degraded to the point where the brightness which can be produced by this light source has reduced by a second predetermined amount (which is the same as the first predetermined amount, e.g. 50%) the first light source is switched back on so that both are simultaneously energized. When this measure fails to maintain the required level of brightness, the power with which the light sources are energized is increased.

11 Claims, 3 Drawing Sheets

ENHANCED MTBF BACKLIGHT SYSTEM AND RELATED METHOD

This application claims priority from Provisional Application Ser. No. 60/063572 filed on Oct. 30, 1997 and entitled "Enhanced MTBF Backlight System."

BACKGROUND OF THE INVENTION

1. Field of the Invention

The present invention relates to a backlighting system for a LCD type display. More specifically, the present invention relates to a backlighting system that switches redundant light sources on and off in a manner which maintains the level of brightness at an acceptable level for prolonged periods of time.

2. Description of the Related Art

Display technology is rapidly changing with the advent of better and brighter liquid crystal displays (LCDs). As is known, cathode ray tubes (CRTs) are being rapidly replaced by LCDs due to the size and power advantages that are possible with such arrangements.

Most LCDs use an independent backlighting arrangement that is designed to illuminate the liquid crystal arrangements so that comfortable viewing of the images that are generated, is possible. These backlighting arrangements often used either cold or hot cathode fluorescent lamps that are disposed behind the LCD panels. These lamps can be arranged in a number of ways. For example, they can be disposed in the form of edgelights, formed in serpentine configurations, and/or disposed so as to function as direct backlight systems.

However CRTs exhibit a longer working life than LCDs. The basic reason for this resides in the manner in which the two displays are illuminated. CRTs excite phosphor coatings with an electron gun. The weakest link in the CRT is the filament of the electron gun. This element usually exhibits a meantime-between-failure (MTBF) on the order of 30,000 hours. It should be noted however, that MTBF in the display art (and in this specification) is defined as the mean operational hours required for a display's brightness to drop by half.

On the other hand, even though the LCD glass has a typical MTBF on the order of 40,000 hours, the best cold cathode fluorescent lamps (CCFL) currently available only exhibit a MTBF of 20,000 hours. This of course is markedly shorter than MTBF exhibited by CRT, and without repair/maintenance of the LCDs, the CRT displays usually last 50% longer than the best LCD due to the short effective life of the CCFL.

LCDs therefore have encountered the drawback that, unless the life of the backlighting system can be increased to match that of the LCD glass or at least the MTBF of the CRT, the replacement of the CRT type displays with LCDs on an industrial scale, will be inhibited due to undesirably high maintenance costs and/or business shutdowns induced by the need to replace the backlight elements.

SUMMARY OF THE INVENTION

It is an object of the invention to provide a LCD backlighting arrangement which can increase the effective working life of the arrangement and attenuate the need to service/replace lamps and to the degree that the MTBF rivals or surpasses that of CRT.

It is a further object of the present invention to provide a LCD backlighting arrangement which is simple and which can be adapted for use with conventional types of light guides etc.

It is a further object of the invention to provide a backlighting arrangement which includes a redundant lamp or lamps which can be selectively energized/de-energized in a predetermined sequence with the main lamp or lamps in a manner which allows the brightness of the backlighting arrangement to be maintained for prolonged periods without the need to replace the lamps and/or perform similar maintenance.

It is yet another object of the invention to provide a method of controlling a redundantly provided backlight lamp(s) in a manner which permits the effective working life of the backlighting arrangement to be extended well beyond that which would be expected with the provision of a conventional lamp arrangement.

In short, the above and other objects are achieved by an arrangement which features the use of at least one redundant or backup light source and a control arrangement which energizes the first or main light source until such time as the brightness of the first light source has reduced by a predetermined amount (e.g., half of its original level). The second backup light source is then switched on while the first is temporarily switched off. Upon the backup light source having degraded to the point where the brightness has reduced by a second predetermined amount (which can be the same as the first predetermined amount, e.g. 50%) the first light source is switched back on so that both are simultaneously energized. When this measure fails to maintain the required level of brightness, the power with which the light sources are energized is increased. If necessary, this power increase can be continued so as to maintain a minimum acceptable level of brightness until such time as complete failure of the lamps occurs.

In accordance with the present invention, it is possible that one or both of the two light sources are operated at either (i) full power, or (ii) at a reduced power level so as to take advantage of the fact that when a CCFL is operated at a power level which is less than its full rated power, the life of the light source is increased geometrically. For example, if a CCFL that has a MTBF of 20,000 hours at full power is operated with a 50% reduction in power, then a MTBF of approximately 100,000 hours can be reasonably expected.

In accordance with the present invention, when the lamps are operated at full power, the effective working life of the backlighting arrangement can be expected to be approximately 2.5 times longer than that of conventional arrangements. However, if the lamps are initially operated at a reduced power, the MTBF of the combination can be expected to be increased by a factor of 5.

More specifically, a first aspect of the present invention resides in a backlight arrangement for a display comprising: a first light source; a second light source; means for monitoring a parameter which varies with the brightness of the light produced by the first and second light sources; and means responsive to the monitoring means for energizing the first and second light sources, the energizing means being arranged to: initially energize only the first light source; respond to the monitoring means indicating that the brightness of the first light source has decreased by a predetermined amount by energizing the second light source and temporarily de-energizing the first light source; and subsequently respond to the monitoring means indicating that the brightness of the second light source has decreased by the predetermined amount by re-energizing the first light source so that both the first and second light sources are concurrently energized.

In the above arrangement, the backlighting arrangement is an LCD type, wherein the first and second light sources cooperate with a light guide to illuminate the LCD.

In the disclosed embodiments, the first and second light sources comprise fluorescent lamps, which are preferably of the cold cathode fluorescent type.

The above mentioned monitoring means includes a circuit which is responsive to the amount of current which is being supplied to the first and second light sources respectively, or is alternatively a light responsive element which varies in response to the amount of light which impinges thereon.

A second aspect of the present invention resides in a method of operating a backlight having first and second redundantly arranged light sources, comprising the steps of: initially energizing only the first light source; monitoring a parameter that varies with the brightness of the light produced by the first light source; energizing the second light source and de-energizing the first light source upon the indication that the brightness of the first light source is reduced by a predetermined amount; monitoring the same parameter to determine the brightness of the light produced by the second light source; and re-energizing the second light source when the brightness of the second light source is indicated as being reduced by the predetermined amount, so that both the first and the second light sources are concurrently energized.

The above mentioned method further comprises the steps of: monitoring the light which is indicated as being produced by the first and second light sources together; and increasing the power with which the first and second light sources are energized in accordance with the indication that the amount of light which is produced by both the first and second light sources has fallen below a predetermined acceptable limit, to maintain the light being produced by the combined first and second light sources at a predetermined minimum acceptable level.

A third aspect of the invention resides in a backlight arrangement having first and second redundantly arranged light sources, comprising: means for initially energizing only the first light source; means for monitoring the brightness of the light produced by the first light source; means for energizing the second light source and de-energizing the first light source upon the brightness of the light from the first light source reduced by a predetermined amount; means for monitoring the brightness of the light produced by the second light source; and means for re-energizing the second light source when the light from the second light source is reduced by the predetermined amount so that both the first and the second light sources are concurrently energized.

The above mentioned backlight arrangement further comprises: means for monitoring the light which is produced by the first and second light sources; and means for increasing the power with which the first and second light sources are energized to maintain the brightness of the light being produced by the combined first and second light sources at a predetermined minimum acceptable level.

BRIEF DESCRIPTION OF THE DRAWINGS

The various features and advantages of the present invention will become more clearly appreciated as a detailed description of the preferred embodiment is given with reference to the appended drawings wherein.

DETAILED DESCRIPTION OF THE PREFERRED EMBODIMENTS

Figure 1:
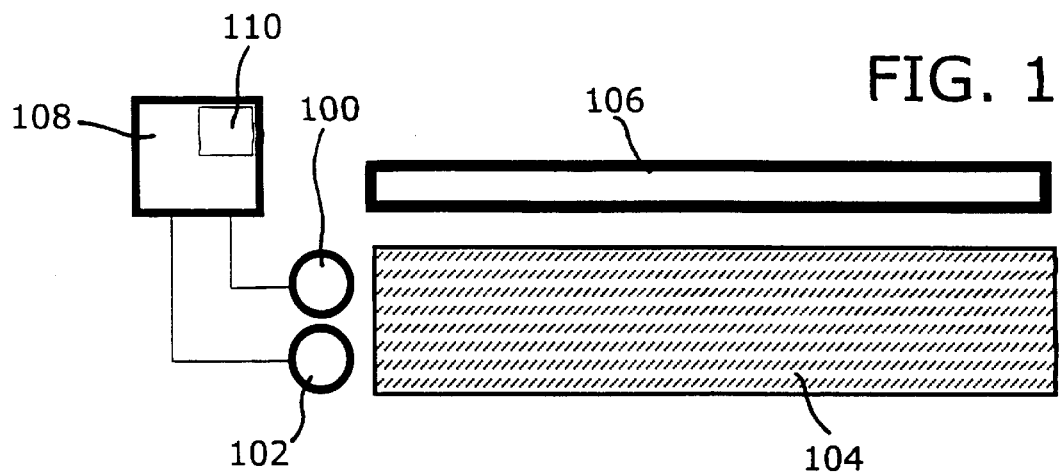
FIG. 1 is a schematic diagram showing a backlight arrangement according to a first embodiment of the invention.

FIG. 1 schematically shows an arrangement according to a first embodiment of the present invention. In this arrangement, two essentially identical light sources (i.e. CCFL) 100, 102 are disposed beside a light guide 104 in a manner wherein either or both are capable of having the light which is emitted therefrom, transferred by the light guide 104 to illuminate the LCD panel 106. For the sake of identification, only the first light 100 source will be referred to as a main lamp while the second light source 102 will be referred to as a backup lamp.

The two lamps 100, 102 are shown operatively connected with an electronic switching circuit (ESC) 108 that controls the energization of the two lamps 100, 102 along with the level of power with which each is illuminated.

In this instance, the ECS 108 includes circuitry such as a microprocessor or a hardwired logic circuit 110, which will allow the status of each lamp 100, 102 to be determined based on the amount of current which is being supplied thereto. It is alternatively possible to use one or more light responsive elements such as photoresistors which are disposed so as to be exposed to the light which is produced by the lamps 100, 102 and to enable the amount of current that is supplied to the lamps 100, 102 to be adjusted in accordance with the sensed brightness levels.

Figure 2:
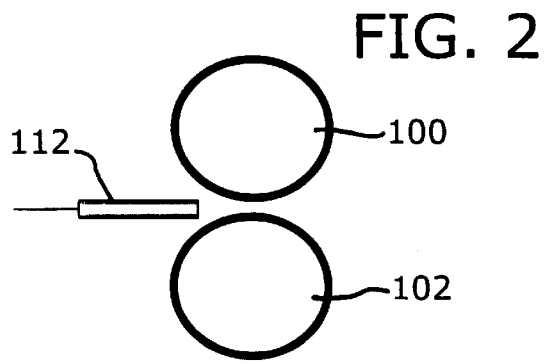
FIG. 2 is a schematic diagram showing a possible sensor arrangement which can be used with the first embodiment.

FIG. 2 shows one possible arrangement wherein a single photoresistor 112 is disposed so as to be responsive to the light emitted from either or both of the lamps 100, 102. The present invention is, of course, not limited to the use of a single photo-responsive element and the use of two or more is possible. Arranging two photo resistors in parallel wherein both are exposed the light from either lamp, renders it possible to detect the failure of one while maintaining suitable control over the power with which each lamp is illuminated.

An example of two lamps being arranged in this edgelight type of arrangement can found in U.S. Pat. No. 5,537,296 issued on Jul. 16, 1996 to Kimura et al. The contents of this reference are hereby incorporated by reference thereto.

Figure 3:
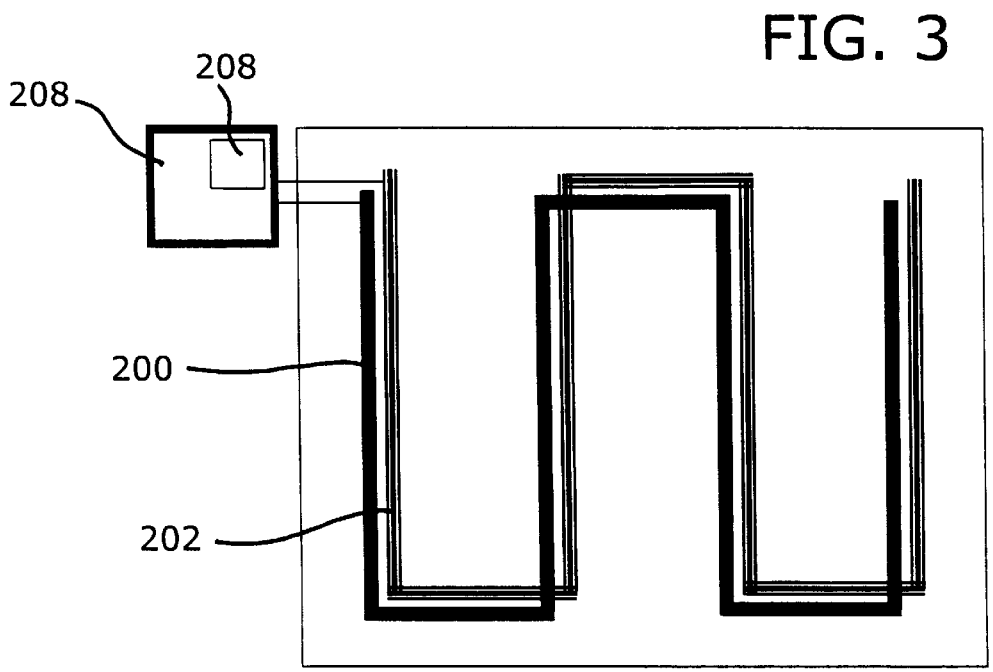
FIG. 3 is a schematic diagram showing a second embodiment of the invention.

FIG. 3 shows a second embodiment of the invention. In this instance the lamps 200, 202 are serpentine in configuration and are arranged one behind the other in a near overlapped configuration wherein one is offset with respect to the other so that there is essentially no blockage of the illumination of one lamp 200 by the other 202. It will be also noted that this lamp arrangement permits the LCD (not shown in this drawing) to be fully and essentially uniformly illuminated by either lamp 200, 202 as controlled by the ECS 208 and logic circuit 210.

Figure 4:
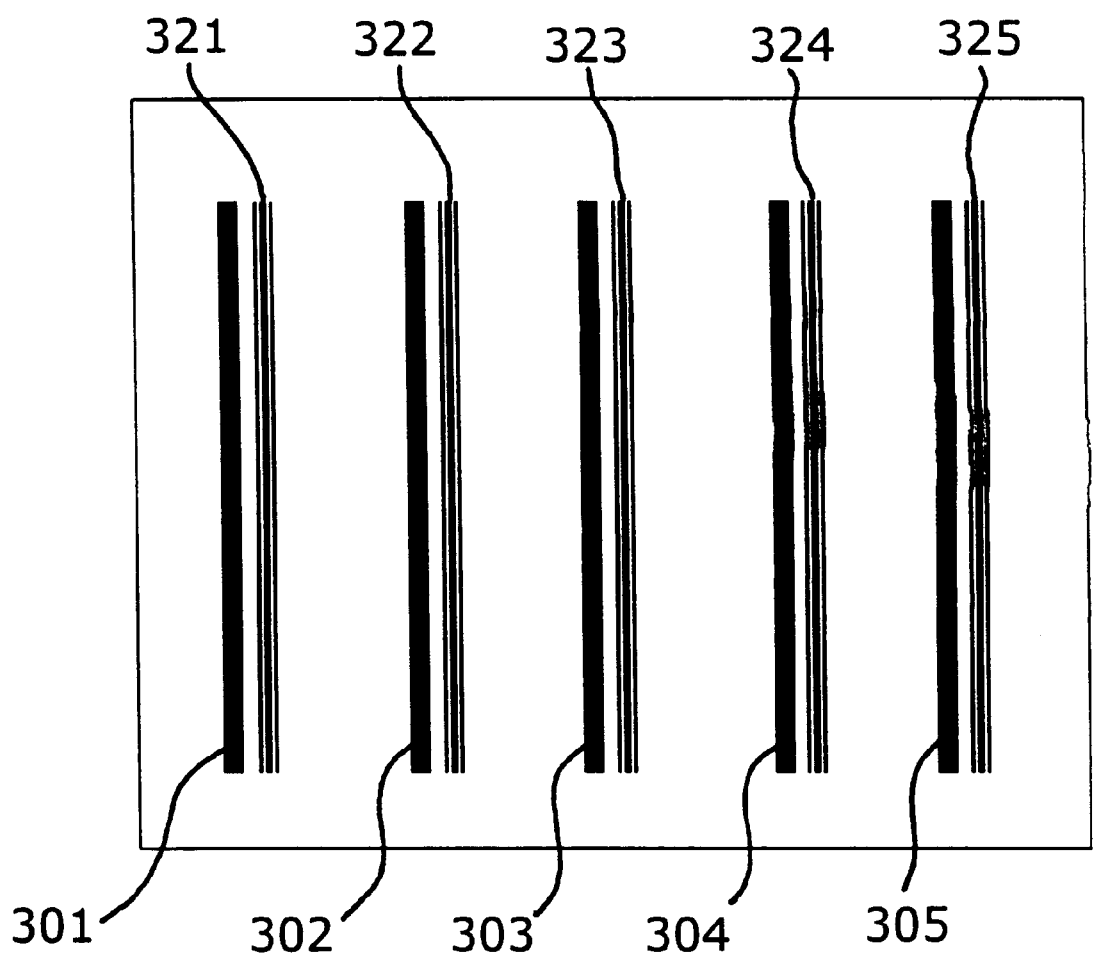
FIG. 4 is a schematic diagram showing backlighting arrangement according to a second embodiment of the invention.

FIG. 4 shows a third embodiment of the invention wherein a first plurality of parallel lamps 301–305 are arranged in an offset manner with respect to a second plurality of back-up lamps 321–325 so that the light from one lamp is not blocked by the other and wherein the effect of each set of lamps is essentially identical with respect to the illumination of a LCD panel disposed in front thereof.

While neither of FIGS. 3 and 4 show the use of a light guide such as that shown in FIG. 1, it is of course with the scope of the invention to interpose same between the light sources and the LCD panel. An example of an arrangement which could be adapted for use with the present invention is shown in U.S. Pat. No. 5,479,275 issued on Dec. 26, 1995 in the name of Abileah. The disclosure of this reference is hereby incorporated by reference thereto.

Figure 5:
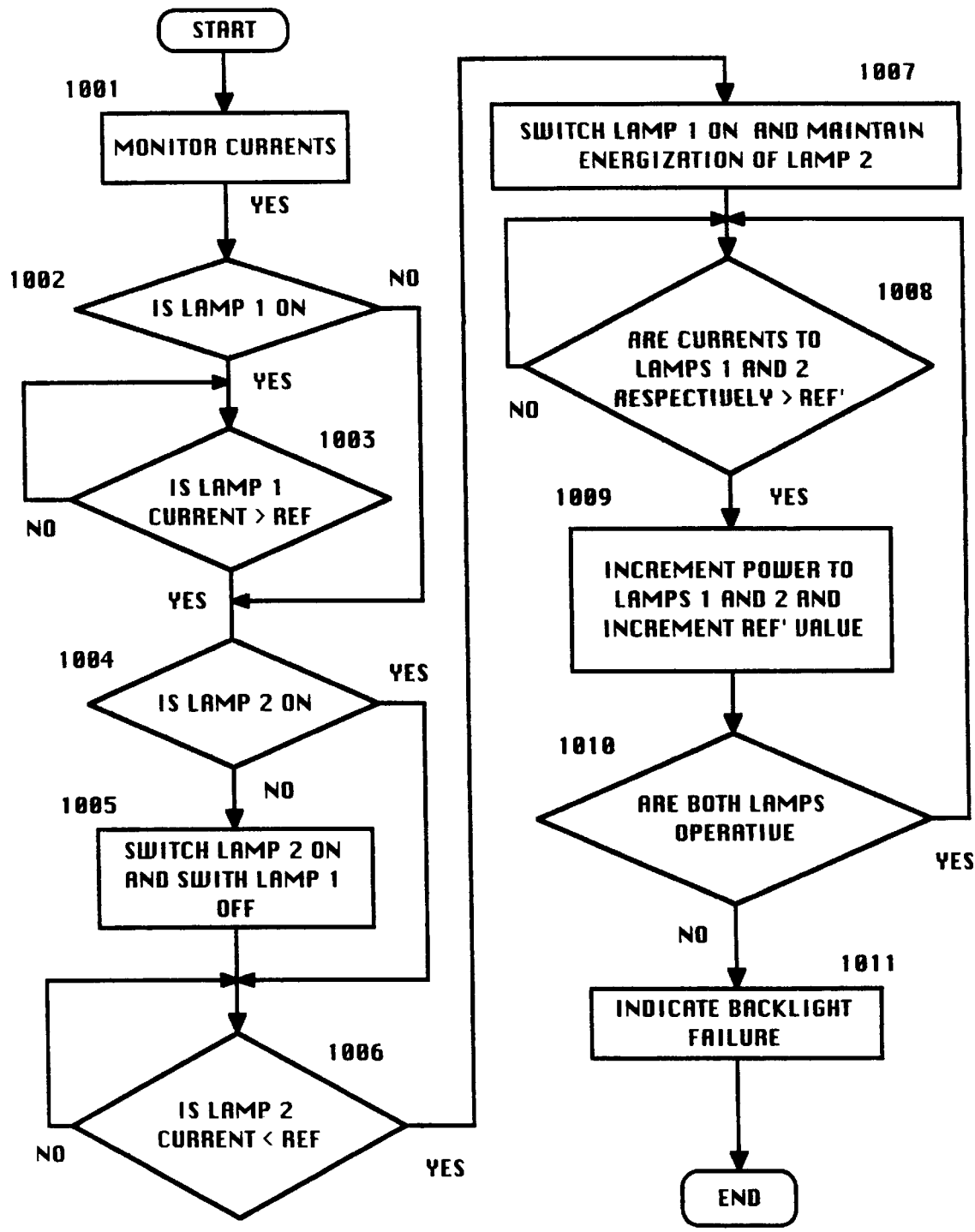
FIG. 5 is a flow chart depicting the operations that are carried out in connection with the control of the light sources which characterizes the present invention.

FIG. 5 shows in flow chart form, the basic operations which are carried out in microprocessors such as those identified by the numerals 108, 208 in FIGS. 1 and 3, respectively.

As will be appreciated, the control which is depicted in this flow chart is such that in step 1001, the level of the current which is being supplied to the respective lamps, is determined, and in step 1002 it is determined if the first of the two lamps is energized or not. This determination can, of course, be based on the current flows per se, determine the amount of light which is being produced per se using photoresistors or the like, or the setting of the switches which control the supply of current to the lamps. A combination of these and/or other parameters is of course, within the scope of the present invention.

If it is found that lamp 1 is in fact ON, then the control, in step 1003, determines if the current being supplied to the lamp is greater than a preset reference value which is indicative of the lamp having deteriorated to a predetermined degree such as being able to only produce 50% of its original brightness. Again, this level of brightness can be based on current level alone, actual illumination as determined using a photosensitive element, or a combination of the two.

If it is determined that the lamp has in fact deteriorated and is drawing more than a predetermined amount of current, then the routine proceeds to determine if the second lamp is energized or not (step 1004). If the lamp is not yet energized, then at step 1005 current is supplied to the second lamp while the supply to the first lamp is temporarily switched off.

When the second lamp deteriorates to the degree that the brightness which can be produced thereby has reduced to the above mentioned limit (e.g. 50%), the control flows from step 1006 to 1007 and re-energizes the first lamp so that both are concurrently or simultaneously energized. This combined illumination of both lamps of course, returns the brightness to its original level.

Following this, the currents which are respectively supplied are monitored against a variable reference R' (step 1008) which is incrementally increased (step 1011) as the lamps continue their slow deterioration. This loop wherein the variable reference R' is incremented, is such as to ensure that the currents which are supplied are such as to slowly increase with the passing of time and at a rate which is selected to maintain the brightness produced by the two lamps as close to the desired level as possible. This is continued until at least one of the lamps fails such as indicated by a zero current flow therethrough.

Although the present invention has been described with reference to only a limited number of embodiments, the various modifications and changes which can made to permit adaptation to other arrangements, without departing from the scope of the present invention, which is limited only by the appended claims, will, in light of the preceding disclosure, be self-evident to a person skilled in the art to which the present invention pertains.

What is claimed is:

1. A backlight arrangement for a display comprising:
    a first light source;
    a second light source;
    means for monitoring a parameter which varies with the brightness of the light produced by said first and second light sources; and
    means, responsive to said monitoring means, for energizing said first and second light sources, said energizing means being arranged to:
        initially energizing only said first light source;
        respond to said monitoring means indicating that the brightness of said first light source has decreased by a predetermined amount, by energizing said second light source and temporarily de-energizes said first light source; and
        respond to said monitoring means indicating that the brightness of said second light source has decreased by the predetermined amount, by re-energizing said first light source so that both said first and second light sources are concurrently energized.

2. A backlighting arrangement as set forth in claim 1, wherein the display is a LCD type.

3. A backlighting arrangement as set forth in claim 2, wherein wherein the first and second light sources cooperate with a light guide to illuminate the LCD.

4. A backlighting arrangement as set forth in claim 1, wherein the first and second light sources comprise fluorescent lamps.

5. A backlighting arrangement as set forth in claim 3, wherein the fluorescent lamps are cold cathode fluorescent lamps.

6. A backlighting arrangement as set forth in claim 1, wherein said monitoring means comprises a circuit which is responsive to the amount of current which being supplied to said first and second light sources respectively.

7. A backlighting arrangement as set forth in claim 1, wherein said monitoring means comprises a circuit which includes a light responsive element which varies in response to the amount of light which impinges thereon.

8. A method of operating a backlight having first and second redundantly arranged light sources, comprising the steps of:
    initially energizing only the first light source;
    monitoring a parameter which varies with the brightness of the light produced by the first light source;
    energizing the second light source and de-energizing the first light source upon the brightness of the light which the first light source is capable of producing, is indicated as having reduced by a predetermined amount;
    monitoring the brightness of the light produced by the second light source; and
    re-energizing the first light source when the brightness of the light which the second light source is capable of producing, reduces by the predetermined amount, so that both the first and the second light sources are concurrently energized.

9. A method as set forth in claim 8, further comprising the steps of:
    monitoring the light which is produced by the concurrently energized first and second light sources; and
    increasing the power with which the first and second light sources are energized in accordance with the monitoring of the amount of light which is produced by both the first and second light sources, to maintain the maximum brightness of the light which is capable of being produced by the combined first and second light sources, at a predetermined minimum acceptable level.

10. A backlight arrangement having first and second redundantly arranged light sources, comprising:

means for initially energizing only the first light source;

means for monitoring the brightness of the light produced by the first light source;

means for energizing the second light source and de-energizing the first light source upon the brightness of the light which the first light source is capable of producing, reduces by a predetermined amount;

means for monitoring the brightness of the light produced by the second light source; and means for re-energizing the first light source when the brightness of the light which the second light source is capable of producing, reduces by the predetermined amount so that both the first and the second light sources are concurrently energized.

11. A backlight arrangement as set forth in claim 10, further comprising:

means for monitoring the light which is produced by the first and second light sources; and means for increasing the power with which the first and second light sources are energized in accordance with the monitoring of the amount of light which is produced by both the first and second light sources, to maintain the maximum brightness of the light which is capable of being produced by the combined first and second light sources at a predetermined minimum acceptable level.

* * * * *